(12) United States Patent
Jain et al.

(10) Patent No.: US 11,087,028 B2
(45) Date of Patent: Aug. 10, 2021

(54) MULTI-LAYERED DATA SECURITY IN MOBILE PERSONAL COMPUTING DEVICES

(71) Applicant: International Business Machines Corporation, Armonk, NY (US)

(72) Inventors: Abhishek Jain, Baraut (IN);
Aakanksha Mathur, Pune (IN);
Sasikanth Eda, Vijayawada (IN);
Sandeep Ramesh Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 16/121,442

(22) Filed: Sep. 4, 2018

(65) Prior Publication Data
US 2020/0074091 A1    Mar. 5, 2020

(51) Int. Cl.
| | |
|---|---|
| *G06F 11/30* | (2006.01) |
| *G06F 12/14* | (2006.01) |
| *G06F 21/62* | (2013.01) |
| *H04L 9/06* | (2006.01) |
| *H04W 12/08* | (2021.01) |
| *G06F 21/78* | (2013.01) |
| *G06N 20/00* | (2019.01) |

(52) U.S. Cl.
CPC ........ *G06F 21/629* (2013.01); *G06F 21/6245* (2013.01); *G06F 21/78* (2013.01); *G06N 20/00* (2019.01); *H04L 9/0631* (2013.01); *H04W 12/08* (2013.01)

(58) Field of Classification Search
CPC .. G06F 21/62; G06F 21/6227; G06F 21/6218; G06F 21/6245; G06F 21/78; G06F 21/629; G06F 21/9227; H04W 12/08; H04L 63/105; H04L 9/0631; H04L 9/0894; G06N 20/00
See application file for complete search history.

(56) References Cited

U.S. PATENT DOCUMENTS

| | | | |
|---|---|---|---|
| 9,087,190 B2 | 7/2015 | Singh | |
| 2004/0064723 A1* | 4/2004 | Barnes | G06F 12/1491 726/1 |
| 2014/0143149 A1 | 5/2014 | Aissi | |
| 2015/0020070 A1* | 1/2015 | Phelan | G06F 9/45558 718/1 |
| 2015/0350251 A1* | 12/2015 | Brander | G06F 16/955 713/168 |

(Continued)

*Primary Examiner* — Shewaye Gelagay
*Assistant Examiner* — Amie C. Lin
(74) *Attorney, Agent, or Firm* — Kunzler Bean & Adamson

(57) ABSTRACT

Methods that can provide multi-layered data security in mobile personal computing devices are provided. One method includes assigning, by a processor, one of a plurality of security levels to applications of a mobile personal computing device, assigning one of the plurality of security levels to storage partitions of a storage device of the mobile personal computing device, and providing the applications access to data stored on the storage partitions based on a nexus of a first assigned security level for each application and a second assigned security level for each storage partition. Systems and apparatus that can include, perform, and/or implement the methods are also provided.

20 Claims, 10 Drawing Sheets

(56) References Cited

U.S. PATENT DOCUMENTS

2016/0080293 A1* 3/2016 Singh .................... H04L 51/046
                                                              715/752
2016/0170730 A1   6/2016 Ollikainen
2018/0232528 A1*  8/2018 Williamson ........... G06N 5/025

* cited by examiner

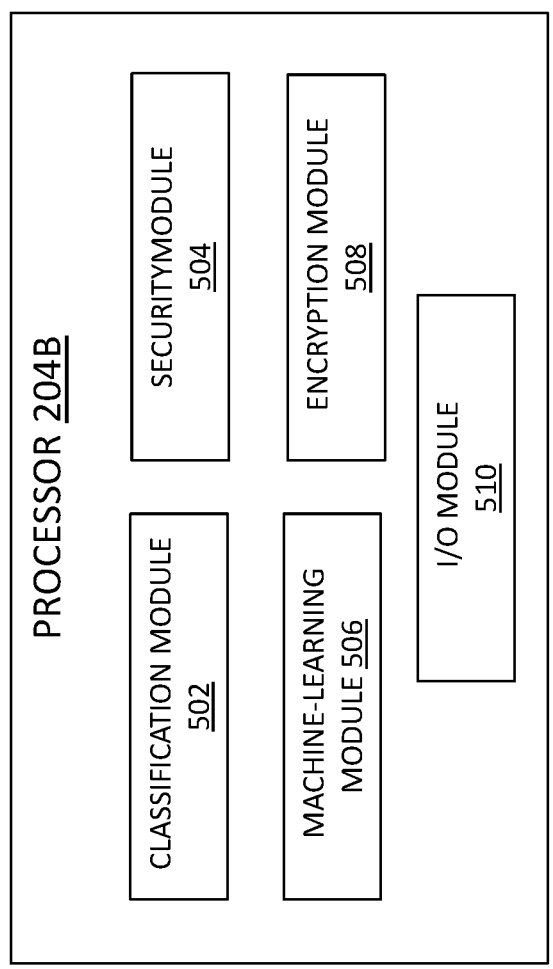

MULTI-LAYERED DATA SECURITY IN MOBILE PERSONAL COMPUTING DEVICES

FIELD

The subject matter disclosed herein relates to mobile personal computing devices and, more particularly, relates to apparatus, methods, and computer program products that provide multi-layered data security in mobile personal computing devices.

BACKGROUND

Conventional operating systems for mobile personal computing devices may provide permissions to one or more installed applications in which a user can control various parameters. For example, the user can grant an application access to one or more other applications and/or the data of the one or more other applications.

While providing permissions to the application(s) can provide the user better control in terms of resource usage and, to a certain extent, enhanced security, conventional operating systems may not provide sufficient security and/or privacy to the user. In other words, at least some data stored on conventional mobile personal computing devices can be vulnerable to malware attacks that use an application already stored thereon as a "back door" way of accessing sensitive and/or private data used by another application for which the application that now includes malware has been granted access permission.

BRIEF SUMMARY

Methods, apparatus, and computer program products that can provide multi-layered data security in mobile personal computing devices are provided. One method includes assigning, by a processor, one of a plurality of security levels to applications of a mobile personal computing device, assigning one of the plurality of security levels to storage partitions of a storage device of the mobile personal computing device, and providing the applications access to data stored on the storage partitions based on a nexus of a first assigned security level for each application and a second assigned security level for each storage partition.

An apparatus includes a classification module that assigns one of a plurality of security levels to applications of a mobile personal computing device and assigns one of the plurality of security levels to storage partitions of a storage device of the mobile personal computing device. The apparatus further includes a security module that provides the applications access to data stored on the storage partitions based on a nexus of a first assigned security level for each application and a second assigned security level for each storage partition. In various embodiments, at least a portion of the classification module and/or the security module comprises one or more of a set of hardware circuits, a set of programmable hardware devices, and/or executable code stored on a set of non-transitory computer-readable storage mediums.

One computer program product includes a computer-readable storage medium including program instructions embodied therewith. The program instructions are executable by a processor to cause the processor to assign one of a plurality of security levels to applications of a mobile personal computing device, assign one of the plurality of security levels to storage partitions of a storage device of the mobile personal computing device, and provide the applications access to data stored on the storage partitions based on a nexus of a first assigned security level for each application and a second assigned security level for each storage partition.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIGS. 5A and 5B are block diagrams of various embodiments of a processor included in the mobile personal computing device of FIG. 2;

DETAILED DESCRIPTION

Figure 1:
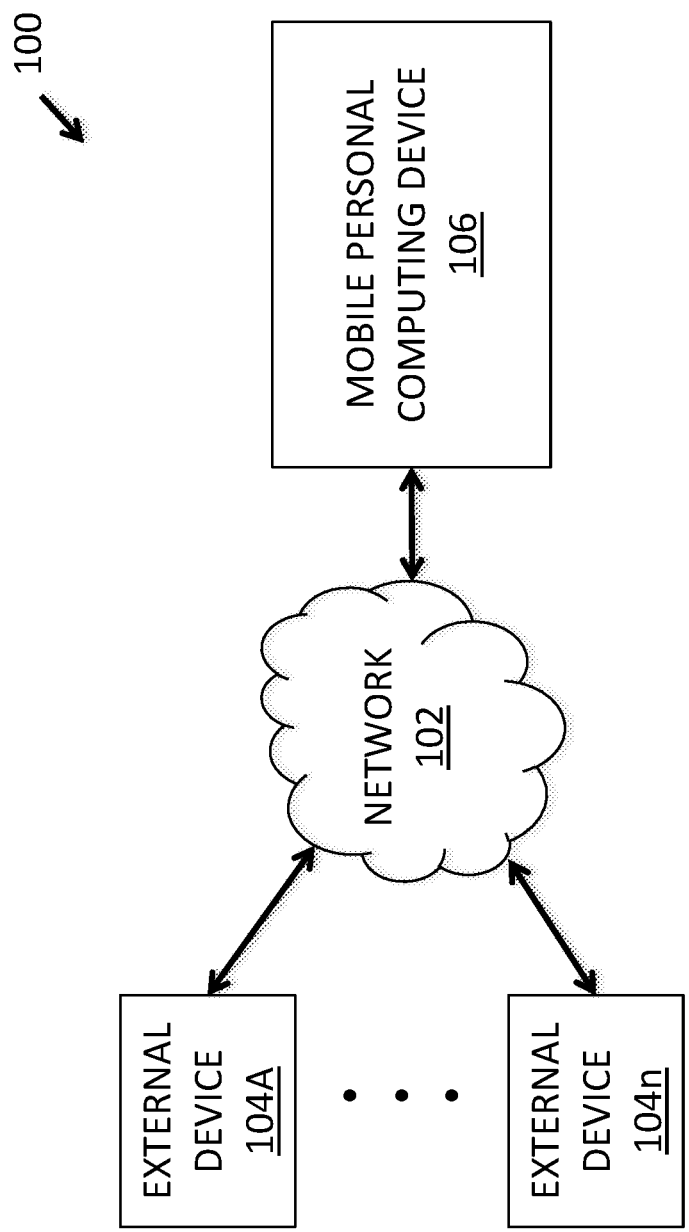
FIG. 1 is a block diagram of one embodiment of a storage network.

Disclosed herein are various embodiments providing methods, systems, and computer program products that can merge protocols for storage networks and systems. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a storage network 100 (or system) including a network 102 connecting a set of external devices 104A through 104n and a mobile personal computing device 106. The network 102 may be any suitable wired and/or wireless network 102 (e.g., public and/or private computer networks in any number and/or configuration (e.g., the Internet, an intranet, a cloud network, etc.)), and/or cellular network 102 that is known or developed in the future that enables the set of storage devices 104 and the mobile personal computing device 106 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), a personal area network (PAN), and/or cellular network, among other examples of computing networks and/or or sets of computing devices connected together for the purpose of sharing resources that are possible and contemplated herein.

An external device 104 can include any suitable computing hardware and/or software capable of accessing and/or communicating with the mobile personal computing device 106 via the network 102. Each external device 104, as part of its respective operation, relies on sending I/O requests to the mobile personal computing device 106 to write data, read data, and/or modify data. Specifically, each external device 104 can transmit I/O requests to read, write, store, communicate, propagate, and/or transport instructions, data, computer programs, software, code, routines, etc., to the mobile personal computing device 106. In general, the mobile personal computing device 106 can be accessed by the external device(s) 104 and/or communication with the mobile personal computing device 106 can be initiated by the external device(s) 104 through a network socket (not shown) utilizing one or more inter-process networking techniques.

A mobile personal computing device 106 can include any suitable computing hardware and/or software capable of accessing and/or communicating with the external computing device(s) 104 via the network 102. A mobile personal computing device 106, as part of its operation, relies on sending I/O requests to the external computing device(s) 104 to write data, read data, and/or modify data. Specifically, mobile personal computing device 106 can transmit I/O requests to read, write, store, communicate, propagate, and/or transport instructions, data, computer programs, software, code, routines, etc., to the external computing device(s) 104. In general, each external computing device 104 can be accessed by the mobile personal computing device 106 and/or communication with the external computing device(s) 104 can be initiated by the mobile personal computing device 106 through the network socket utilizing the one or more inter-process networking techniques.

In various embodiments, a mobile personal computing device 106 can include, but is not limited to, a cellular telephone, a personal digital assistant (PDA), a laptop; a wearable computing device (e.g.; a smartwatch, fitness tracker, biometric monitor, etc.), and/or any other type of mobile computing device of an individual that are possible and contemplated herein.

Figure 2:
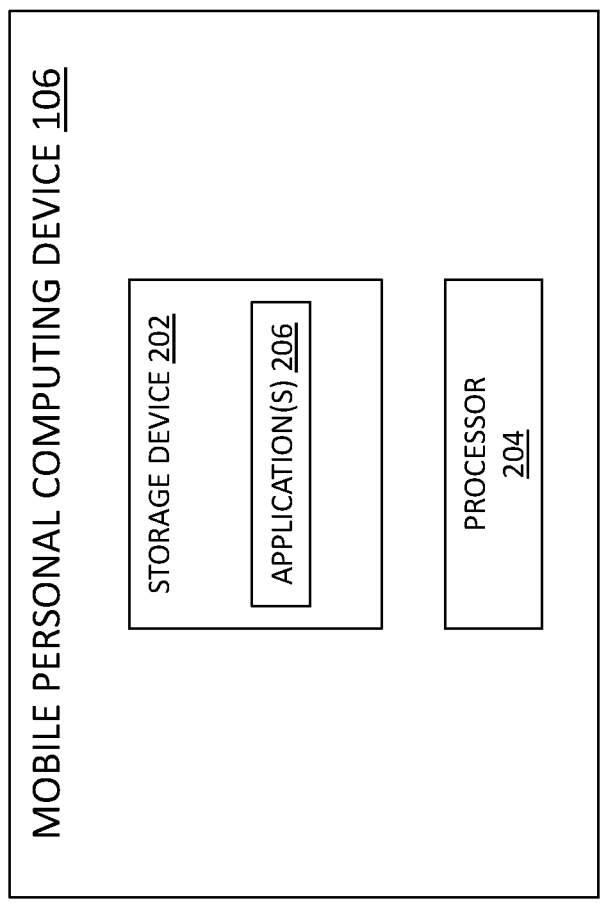
FIG. 2 is a block diagram of one embodiment of a mobile personal computing device included in the storage network of FIG. 1.

Referring to FIG. 2, FIG. 2 is a block diagram of one embodiment of the mobile personal computing device 106 illustrated in and discussed with reference to FIG. 1. At least in the illustrated embodiment, the mobile personal computing device 106 includes, among other components, a storage device 202 and a processor 204 coupled to and/or in communication with one another.

The storage device 202 may include any suitable type of device and/or system that is known or developed in the future that can store computer-useable data. In various embodiments, a storage device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 204).

In various embodiments, a storage device 202 may include a hard disk drive (HDD), a solid-state device (SSD), and/or a self-encrypting drive (SED), among other types of storage devices 202 that are possible and contemplated herein. A storage device 202, in some embodiments, can be storage partitioned into a plurality of storage regions utilizing a disk storage partitioning or disk slicing technique.

A storage device 202, in various embodiments, can store a set of applications 206 for execution by processor 204. The set of applications can include any suitable quantity of applications that a user and/or mobile personal computing device 106 may desire and/or need to perform/provide various functions on the mobile personal computing device 106. Further, an application 206 can include any suitable type of application 206, that is known or developed in the future that a user and/or mobile personal computing device 106 may desire and/or need to perform/provide various functions on the mobile personal computing device 106.

Figure 3:
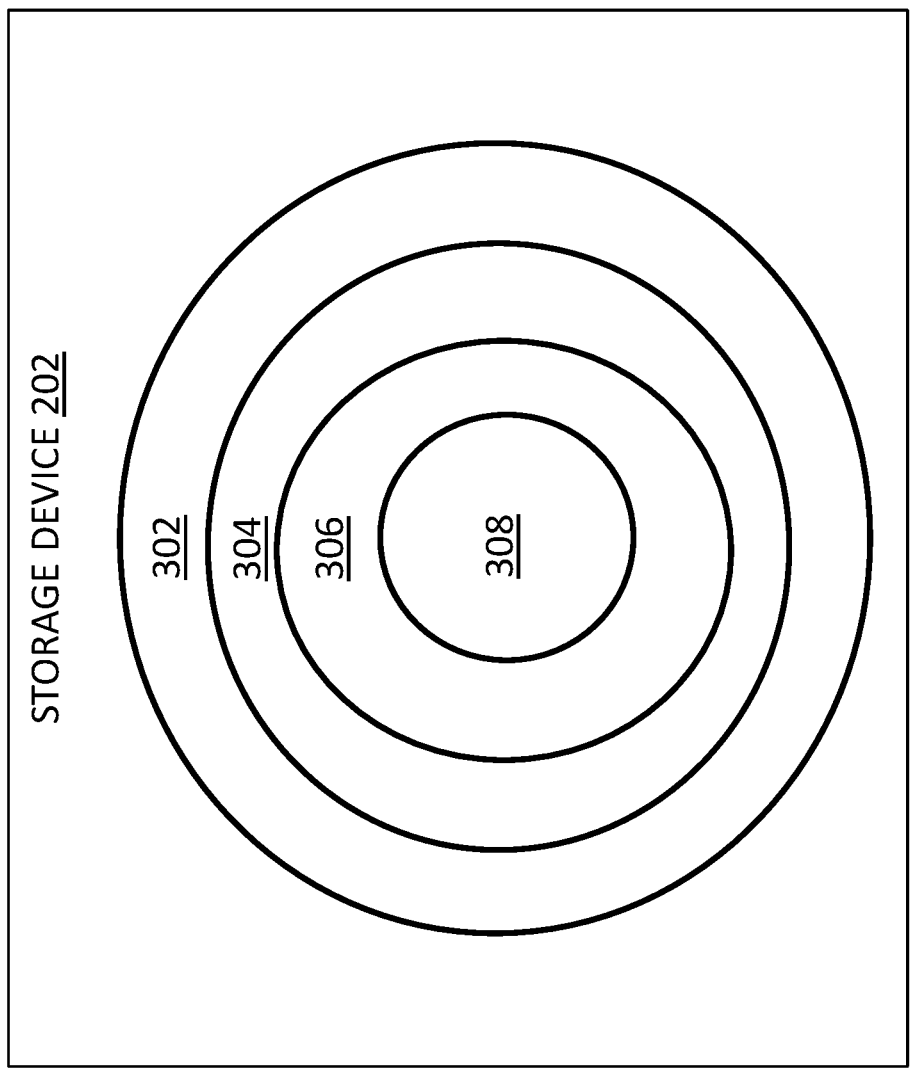
FIG. 3 is a block diagram of one embodiment of a storage device included in the mobile personal computing device of FIG. 2.

With reference to FIG. 3, FIG. 3 is a block diagram of one embodiment of a storage device 202 illustrated in and discussed with reference to FIG. 2 that has been storage partitioned/sliced to include a plurality of storage regions. At least in the illustrated embodiment, the storage device 202 is storage partitioned to include four storage regions or storage partitions. Specifically, the storage device 202 includes a storage region 302, a storage region 304, a storage region 306, and a storage region 308, which can also be referred to as storage partition 302, storage partition 304, a storage partition 306, and storage partition 308, respectively.

In various embodiments, storage regions 302, 304, 306, and 308 may include the same size and/or different sizes. That is, in some embodiments, each of storage regions 302, 304, 306, and 308 include the same size or different sizes. In other embodiments, at least two of storage regions 302, 304, 306, and 308 include different sizes. In still other embodiments, at least three of storage regions 302, 304, 306, and 308 include different sizes.

Storage regions 302, 304, 306, and 308 may each be assigned a security level by processor 204, as discussed elsewhere herein. For example, a storage region 302 may be assigned a first security level (SL1), a storage region 304 may be assigned a second security level (SL2), a storage region 306 may be assigned a third security level (SL3), and a storage region 308 may be assigned a fourth security level (SL4), among other security levels and/or SL assignments that are possible and contemplated herein.

In various embodiments, SL1 may be the highest security level, SL2 may be a medium-high security level, SL3 may be a medium-low security level, and SL4 may be the lowest security level, among other rankings/priorities that are possible and contemplated herein. For example, SL4 may be the highest security level, SL3 may be a medium-high security level, SL2 may be a medium-low security level, and SL1 may be the lowest security level. For discussion purposes herein, SL1, SL2, SL3, and SL4 are ranked from highest to lowest in this order.

A storage region 302, which includes SL1, can store a type of data that is considered the most sensitive, important and/or private. Examples of this type of data may include, but is not limited to, financial/banking data (e.g., credit card data, savings account data, checking account data, loan data, etc.), ownership/title data, legal data, health/healthcare data, and/or personal data (e.g., private photographs, pictures, video, messages, etc. shared with a small group), among other types of data that can be considered the most sensitive, important and/or private.

In various embodiments, the data stored (e.g., written to, read from, etc.) on the storage region 302 can be encrypted utilizing a highest level and/or longest string encryption technique, which can be any encryption technique that is known or developed in the future. The data stored on the storage region 302 can be referred to herein as encryption level 1 (EL1) data. In some embodiments, the EL1 data is encrypted/decrypted using an Advanced Encryption Standard 256-bit (AES-256) encryption technique (key), among other encryption techniques that are possible and contemplated herein.

A storage region 304, which includes SL2, can store a type of data that is considered relatively sensitive, important and/or private, but not considered the most sensitive, important and/or private. Examples of this type of data may include, but is not limited to, some forms of financial/banking data (e.g., notices, communications, etc.) and/or personal data (e.g., photographs, pictures, video, messages, etc. shared with a small group), among other types of data that can be considered sensitive, important and/or private.

The data stored (e.g., written to, read from, etc.) on the storage region 304, in various embodiments, can be encrypted utilizing a medium-high level and/or second longest string encryption technique, which can be any encryption technique that is known or developed in the future. The data stored on the storage region 304 can be referred to herein as encryption level 2 (EL2) data. In some embodiments, the EL2 data is encrypted/decrypted using an Advanced Encryption Standard 192-bit (AES-192) encryption technique (key), among other encryption techniques that are possible and contemplated herein.

A storage region 306, which includes SL3, can store a type of data that is considered somewhat sensitive, important and/or private, but not considered sensitive, important and/or private. Examples of this type of data may include, but is not limited to, some forms of financial/banking data and/or personal data (e.g., photographs, pictures, video, messages, etc. shared with a group), among other types of data that can be considered somewhat sensitive, important and/or private.

In various embodiments, the data stored (e.g., written to, read from, etc.) on the storage region 306 can be encrypted utilizing a medium-low level and/or third longest string encryption technique, which can be any encryption technique that is known or developed in the future. The data stored on the storage region 306 can be referred to herein as encryption level 3 (EL3) data. In some embodiments, the EL3 data is encrypted/decrypted using an Advanced Encryption Standard 128-bit (AES-128) encryption technique (key), among other encryption techniques that are possible and contemplated herein.

A storage region 308, which includes SL4, can store any type of data that is not considered sensitive, important and/or private. Examples of this type of data may include, but is not limited to, some forms of financial/banking data (e.g., advertisements, offers, etc.) and/or public data (e.g., public photographs, pictures, video, messages, etc.), among other types of data that may not be considered relatively sensitive, important and/or private.

In various embodiments, the data stored (e.g., written to, read from, etc.) on the storage region 308 may be unencrypted or encrypted utilizing a lowest level and/or shortest string encryption technique, which can be any encryption/decryption technique (key) that is known or developed in the future. The data stored on the storage region 302 can be referred to herein as level 4 (L4) data.

While storage device 202 is discussed as being storage partitioned to include four storage regions (e.g., storage regions 302, 304, 306, and 308), storage device 202 is not limited to four storage regions. That is, other embodiments of a storage device 202 may include two storage regions, three storage regions, or a quantity of storage regions greater than four. Storage device 202 being storage partitioned with a plurality of storage regions can allow storage device 202 to implement a stackable filesystem.

Figure 4:
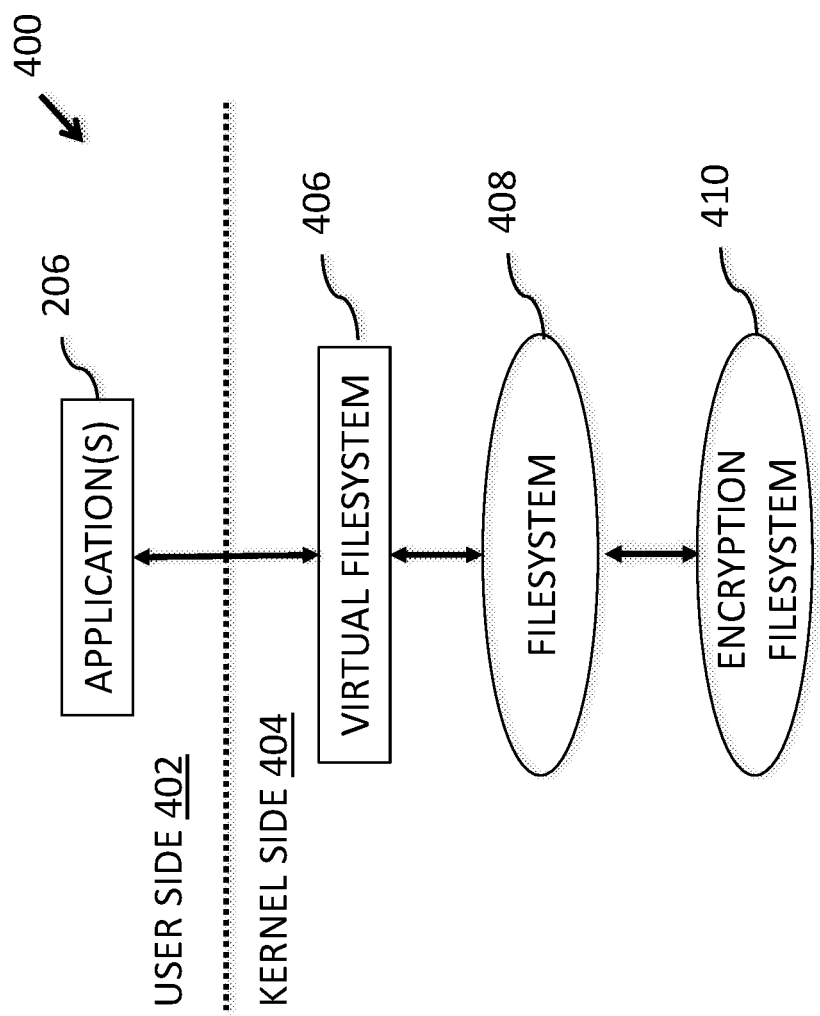
FIG. 4 is a diagram of one embodiment of a stackable filesystem included in the storage device of FIG. 3.

Referring to FIG. 4, FIG. 4 is a diagram 400 illustrating one embodiment of a stackable filesystem that can implemented on storage device 202. At least in the illustrated embodiment, a user side 402 can include, among other components, a set of applications 206, which is illustrated in and discussed with reference to FIG. 2.

The application(s) 206 may be able to access data stored on the storage device 202 via a stacked filesystem on a kernel side 406. An application may be granted/denied access to particular data stored on a storage region ((e.g., storage region 302, storage region 304, storage region 306, and storage region 308) of a storage partitioned storage device 202 based on a nexus of the security level assigned to the application 206 and the security level of the storage region upon which the data that is included in a request issued by the application 206 is to be written to or is stored thereon, as discussed elsewhere herein.

A kernel side 404, can include, among other components, a virtual filesystem 406, a filesystem 408, and an encrypted filesystem 410. The virtual filesystem 406 may include any suitable structure, organization, hardware, and/or software than is known or developed in the future that can provide mapping for a filesystem (e.g., filesystem 408 and/or encrypted filesystem 410).

A filesystem 408 may include any suitable structure, organization, hardware, and/or software than is known or developed in the future that can store data in an organized and/or structured manner. In various embodiments, a filesystem 408 can store raw and/or unencrypted data.

An encrypted filesystem 410 may include any suitable structure, organization, hardware, and/or software than is known or developed in the future that can store encrypted data in an organized and/or structured manner. In various embodiments, an encrypted filesystem 410 can store various types of encrypted data.

While diagram 400 illustrates a specific example of a stackable filesystem, the various embodiments of storage device 202 are not limited to this example. That is, storage device 202 may include any type of stacked filesystem that allows storage device 202 to store encrypted/unencrypted data and perform the various functions discussed herein.

Figure 5A:
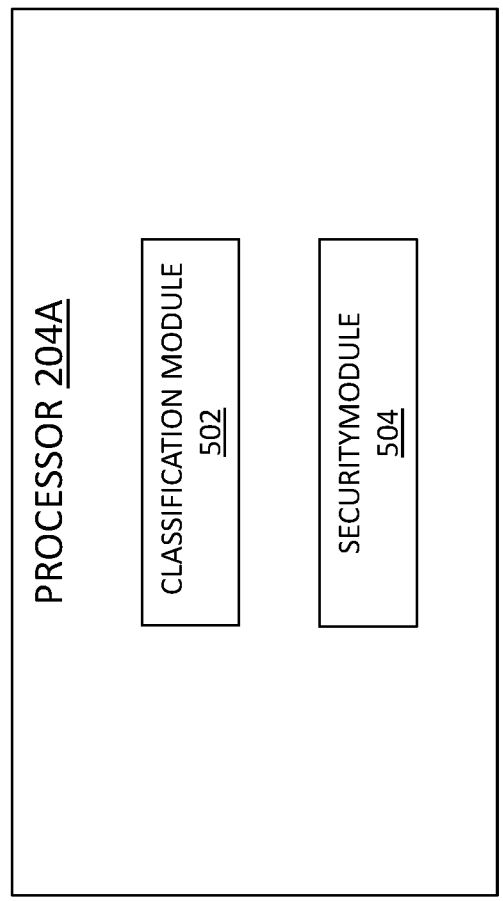

With reference to FIG. 5A, FIG. 5A is block diagram of one embodiment of a processor 204A that can be included in the mobile personal computing device illustrated in and discussed with reference to FIG. 2. At least in the illustrated embodiment, the processor 204A includes, among other components, a classification module 502 and a security module 504.

A classification module 502 may include any suitable hardware and/or software that can assign and/or associate a security level of a set of security levels (e.g., SL1, SL2, SL3, and/or SL4, etc.) to various hardware, data, software entities. In various embodiments, a classification module 502 can assign a security level to each storage region (e.g., storage region 302, storage region 304, storage region 306, and storage region, etc.) of a storage device 202 that has been portioned to include a plurality of storage regions. In some embodiments, a classification module 502 can assign SL1 to storage region 302, SL2 to storage region 304, SL3 to storage regions 306, and SL4 to storage regions 308, as discussed elsewhere herein.

A classification module 502, in various embodiments, can assign a security level to each unit of data (e.g., portion, block, chunk, etc.) stored on a storage device 202. For example, the classification module 502 can assign SL1, SL2, SL3, and SL4 to each unit of data stored on the storage device 202.

In additional or alternative embodiments, a classification module can assign a security level to each unit of data received by a storage device 202 (e.g., incoming data) for at least temporary storage on the storage device 202. For example, the classification module 502 can assign SL1, SL2, SL3, and SL4 to each received unit of data for storage on the storage device 202.

A security level can be assigned to each unit of data based on the data type, which can include the source of the data (e.g., a medical professional, a financial institution, a governmental agency, etc.), of each unit of data. The security level/type correlation may be based on any suitable factor that can identify and protect data that may include one or more levels of sensitivity, importance, and/or privacy. For example, medical data, legal data, financial data, and/or the like data can be considered the most sensitive, important, and/or private. Data that is readily available to the public or in the public domain may be considered the least sensitive, important, and/or private or not sensitive, important, and/or private at all. Other types of data may fall somewhere in between these two ends of the spectrum and may be considered relatively or somewhat sensitive, important, and/or private.

In a non-limiting example, a unit of data from a healthcare professional (e.g., medical data) may be assigned SL1 because medical data may be considered the most sensitive, important, and/or private. In another non-limiting example, a unit of data that is available to the general public (e.g., a picture in the public domain) may be assigned SL4 because the picture may not can be considered sensitive, important, and/or private since it is in the public domain.

In some embodiments, a classification module 502 can automatically and/or independently assign a security level to unit of data based on the data type. In alternative embodiments, a classification module 502 can assign a security level to a unit of data based on inputs received from a user. In other embodiments, classification module 502 can automatically/independently assign a security level to a subset of data units and assign a security level to the data unit(s) based on inputs received from a user.

In additional or alternative embodiments, a classification module 502 can assign a security level to each application 206 stored on a storage device 202. For example, the classification module 502 can assign SL1, SL2, SL3, and SL4 to each of the applications 206 stored on the storage device 202.

A security level can be assigned to each application 206 based on the application type, which can include the application source, of each application 206. The security level/type correlation may be based on any suitable factors that can identify and protect data that may include one or more levels of sensitivity, importance, and/or privacy. In a non-limiting example, an application 206 from a financial institution may be assigned SL1 because financial data can be considered the most sensitive, important, and/or private. In another non-limiting example, an advertising application 206 that sends/receives advertising data that is available to the general public may be assigned SL4 because the advertising data may not can be considered sensitive, important, and/or private since it is readily available to the general public.

In some embodiments, a classification module 502 can automatically and/or independently assign a security level to each application 206. In alternative embodiments, a classification module 502 can assign a security level to each application 206 based on inputs received from a user. In other embodiments, classification module 502 can automatically/independently assign a security level to a subset of applications 206 and assign a security level to the remaining application(s) 206 based on inputs received from a user.

A security module 504 can include any suitable hardware and/or software that can perform access operations to the data stored on and/or received by a mobile personal computing device 106. In various embodiments, access operations can include granting access and/or denying access to the data stored on a particular storage partition (e.g., storage partition 302, storage partition 304, storage partition 306, and/or storage partition 3026) of a storage device 202 based on a nexus of a security level assigned to each application and a security level assigned to each of the storage partitions.

In some embodiments, a nexus of security levels can include the security level assigned to an application 206 matching a security level assigned to a storage partition to which the application is attempting to perform one or more I/O operations (e.g., read operations, write operations, etc.) thereon. In a non-limiting example, a nexus of security level can be established if an application 206 assigned SL1 is attempting to perform one or more I/O operations on storage partition 302, which is also assigned SL1. In another non-limiting example, a nexus of security levels can be established if an application 206 assigned SL2 is attempting to perform one or more I/O operations on storage partition 304, which is also assigned SL2. In an alternative non-limiting example, a nexus of security levels can be established if an application 206 assigned SL3 is attempting to perform one or more I/O operations on storage partition 306, which is also assigned SL3. In yet another non-limiting example, a nexus of security levels can be established if an application 206 assigned SL4 is attempting to perform one or more I/O operations on storage partition 308, which is also assigned SL4.

In additional or alternative embodiments, a nexus of security levels can include the security level assigned to an application 206 be equal to or exceeding a security level assigned to a storage partition to which the application is attempting to perform one or more I/O operations (e.g., read operations, write operations, etc.) thereon. In a non-limiting example, a nexus of security level can be established if an application 206 assigned SL1 is attempting to perform one or more I/O operations on storage partitions 302, 304, 306, and 308 since SL1 is greater than or equal to the security levels assigned to each of storage partitions 302, 304, 306, and 308. In another non-limiting example, a nexus of security levels can be established if an application 206 assigned SL2 is attempting to perform one or more I/O operations on storage partitions 304, 306, and 308 since storage partitions 304, 306, and 308 are assigned SL2, SL3, and SL4, respectively. In an alternative non-limiting example, a nexus of security levels can be established if an application 206 assigned SL3 is attempting to perform one or more I/O operations on storage partitions 306 and 308 since storage partitions 306 and 308 are assigned SL3 and SL4, respectively. In yet another non-limiting example, a nexus of security levels can be established if an application 206 assigned SL4 is attempting to perform one or more I/O operations on storage partition 308, which is also assigned SL4.

In various embodiments, a security module 504 may deny access to the data stored on a particular storage partition (e.g., storage partition 302, storage partition 304, storage partition 306, and/or storage partition 3026) based on the nexus of a security level assigned to each application and a security level assigned to each of the storage partitions. In some embodiments, a nexus of security levels can include the security level assigned to an application 206 matching a security level assigned to a storage partition to which the application is attempting to perform one or more I/O operations (e.g., read operations, write operations, etc.) thereon.

In a non-limiting example, an application 206 assigned SL1 can be denied access to performing I/O operations on storage partitions 304, 306, and 308, which are assigned SL2, SL3, and SL4, respectively, since there is not a match of security levels. In another non-limiting example, an application 206 assigned SL2 can be denied access to performing I/O operations on storage partitions 302, 306, and 308, which are assigned SL1, SL3, and SL4, respectively, since there is not a match of security levels. In an alternative non-limiting example, an application 206 assigned SL3 can be denied access to performing I/O operations on storage partitions 302, 304, and 308, which are assigned SL1, SL1, and SL4, respectively, since there is not a match of security levels. In yet another non-limiting example, an application 206 assigned SL4 can be denied access to performing I/O operations on storage partitions 302, 304, and 306, which are assigned SL1, SL2, and SL3, respectively, since there is not a match of security levels.

In additional or alternative embodiments, a nexus of security levels can include the security level assigned to an application 206 be equal to or exceeding a security level assigned to a storage partition to which the application is attempting to perform one or more I/O operations (e.g., read operations, write operations, etc.) thereon. In a non-limiting example, an application 206 assigned SL1 will not be denied access to performing I/O operations on any of storage partitions 302, 304, 306, and 308, which are assigned SL1, SL2, SL3, and SL4, respectively, since SL1 assigned to the application 206 is greater than or equal to the security levels assigned to each of storage partitions 302, 304, 306, and 308. In another non-limiting example, an application 206 assigned SL2 will be denied access to performing I/O operations on storage partition 302, which is assigned SL1, since SL2 assigned to the application 206 is less than the security level assigned to storage partition 302. In an alternative non-limiting example, an application 206 assigned SL3 will be denied access to performing I/O operations on storage partitions 302 and 304, which are assigned SL1 and SL2, respectively, since SL2 assigned to the application 206 is less than the security levels assigned to storage partitions 302 and 304. In yet another non-limiting example, an application 206 assigned SL4 will be denied access to performing I/O operations on storage partitions 302, 304, and 306, which are assigned SL1, SL2, and SL3, respectively since SL4 assigned to the application 206 is less than the security levels assigned to storage partitions 302, 304, and 306.

A security module 504, in various embodiments, can terminate an I/O request directed to a storage partition from an application 206 in response to a nexus of security levels not being established between the application 206 and the storage partition that the application 206 is attempting to perform one or more I/O operations on and/or access. In additional or alternative embodiments, a security module 504 can terminate all I/O operations directed to a storage partition from an application 206 in response to a nexus of security levels not being established between the application 206 and the storage partition that the application 206 is attempting to perform the I/O operation(s) on and/or access.

Referring to FIG. 5B, FIG. 5B is block diagram of another embodiment of a processor 204B that can be included in the mobile personal computing device illustrated in and discussed with reference to FIG. 2. A processor 204B, in various embodiments, can include a classification module 502 and a security module 504 similar to a processor 204A illustrated in and discussed with reference to FIG. 5A. At least in the illustrated embodiment, a processor 204B can further include, among other components, a machine-learning module 506, an encryption module 508, and an I/O module 510.

A machine-learning module 506 may include any hardware and/or software that can determine/identify a data type for data utilizing a machine-learning technique and/or process. The machine-learning technique and/or process may include any suitable machine-learning technique and/or process that is known or developed in the future that can determine and/or identify one or more data types for various incoming data and/or data stored on a storage device 202.

The one or more data types may include any suitable type of data that can include one or more levels of sensitivity, importance, and/or privacy, as discussed elsewhere herein. For example, a machine-learning module 506 can determine whether incoming data and/or data stored in a storage device 202 is highly or the most sensitive/important/private, is relatively sensitive/important/private, is somewhat sensitive/important/private, or is not sensitive/important/private, among other levels of sensitivity, importance, and/or privacy that are possible and contemplated herein.

As discussed elsewhere herein, a classification module 502 can assign a security level SL1, SL2, SL3, and SL4 to the various types of data. For example, a classification module 502 can assign a security level SL1 to the most sensitive/important/private data, assign a security level SL2 to relatively sensitive/important/private data, assign a security level SL3 to somewhat sensitive/important/private, and assign a security level SL4 to data that is not considered sensitive/important/private, as determined/identified by a machine-learning module 506.

An encryption module 508 may include any hardware and/or software that can encrypt data utilizing an encryption technique and/or process. The encryption technique and/or process may include any suitable encryption technique and/or process that is known or developed in the future that can encrypt incoming data and/or data stored on a storage device 202.

In various embodiments, an encryption module 508 can encrypt data using an Advanced Encryption Standard (AES) encryption technique. In some embodiments, an encryption module 508 can encrypt data with one or more different levels of encryption based on the data type determined by a machine-learning module 506. In a non-limiting example, an encryption module 508 may encrypt the most sensitive/important/private data with an AES 256-bit (AES-256) encryption technique/process/key, relatively sensitive/important/private data with an AES 192-bit (AES-192) encryption technique/process/key, somewhat sensitive/important/private data with an AES 128-bit (AES-128,) encryption technique/process/key, and may decline to encrypt data that is determined/identified as not be sensitive/important/private, among other levels and/or hierarchies that are possible and contemplated herein.

In additional or alternative embodiments, an encryption module 508 can encrypt data with one or more different levels of encryption based on a storage partition (e.g., one or more of storage partitions 302, 304, 306, and 308) upon which the data is stored and/or which incoming data is to be stored. In a non-limiting example similar to above, an encryption module 508 may encrypt incoming data determined/identified as the most sensitive/important/private data with an AES 256-bit (AES-256) encryption technique/process/key, relatively sensitive/important/private data with an AES 192-bit (AES-192) encryption technique/process/key, somewhat sensitive/important/private data with an AES 128-bit (AES-128,) encryption technique/process/key, and may decline to encrypt data that is determined/identified as not be sensitive/important/private, among other levels and/or hierarchies that are possible and contemplated herein.

An encryption module 508, in some embodiments, can change and/or modify an encryption key for a storage partition in response to the security module 504 determining/detecting that a nexus of the security levels of an application 206 and a particular storage partition that the application 206 is directing/targeting an I/O request is not established. That is, the encryption module 508 can change and/or modify an encryption key for a storage partition in response to the security module 504 determining/detecting that an application 206 assigned with a security level that does not match and/or a lower security level than the security level assigned to the particular storage partition that the application 206 is directing/targeting an I/O request. In this manner, the encryption module 508 and the security module 504 can coordinate their efforts to ensure that a backdoor use of malware in an application on the mobile personal computing device does not gain unauthorized access to data stored on a storage device 202.

An I/O module 510 may include any hardware and/or software that can perform one or more I/O operations (e.g., read operations, write operations, etc.) on a storage device 202. In various embodiments, an I/O module 510 can perform and/or decline to perform (e.g., terminate) I/O operations corresponding to I/O requests received from the applications 206 based on a nexus determination performed by a security module 504.

In various embodiments, an I/O module 510 can perform I/O operations on storage partitions 302, 304, 306, and 308 corresponding to I/O requests received from an application 206 in response to a security module 504 determining a nexus of the security level of the application and the security level of the storage partition and/or data upon to which the I/O requests are directed, as discussed elsewhere herein. The I/O module 510, in some embodiments, can perform the I/O operations without allowing the application to access the storage partition to which the I/O request is directed and/or targeted. In various additional or alternative embodiments, an I/O module 510 can decline to perform and/or terminate I/O operations on storage partitions 302, 304, 306, and 308 corresponding to I/O requests received from an application 206 in response to a security module 504 determining that a nexus of the security level of the application and the security level of the storage partition and/or data upon to which the I/O requests are directed has not been established, as discussed elsewhere herein.

Figure 6:
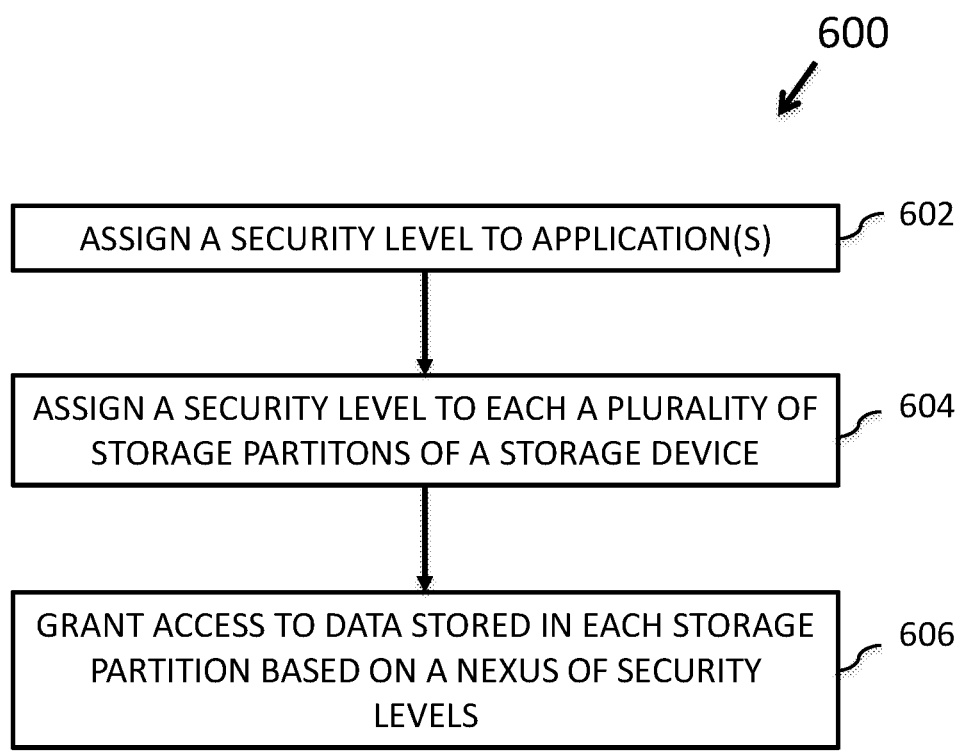
FIG. 6 is a schematic flow chart diagram illustrating one embodiment of a method for providing multi-layered data security in the mobile personal computing device of FIG. 2.

With reference to FIG. 6, FIG. 6 is a schematic flow chart diagram illustrating one embodiment of a method 600 for providing multi-layered data security in a mobile personal computing device 106. At least in the illustrated embodiment, method 600 can begin by a classification module 502 of a processor 204 assigning one of a plurality of security levels (e.g., SL1, SL2, SL3, and SL4, etc.) to applications 206 of a mobile personal computing device 106 (block 602).

The classification module 502 can further assign one of the plurality of security levels to each storage partition (e.g., storage partition 302, storage partition 304, storage partition 306, and storage partition 306, etc.) of a storage device 202 in the mobile personal computing device 106 (block 604). A security module of the processor 204 can grant access to data stored on each storage partition of the storage device 202 to the applications 206 based on a nexus of the security level assigned to the applications 206 and the security level assigned to each storage partition (block 606).

The nexus can be the security level assigned to an application 206 matching the security level assigned to each storage partition, as discussed elsewhere herein. Alternatively, or additionally, the nexus can be the security level assigned to an application 206 being greater than or equal to the security level assigned to each storage partition, as discussed elsewhere herein.

Figure 7:
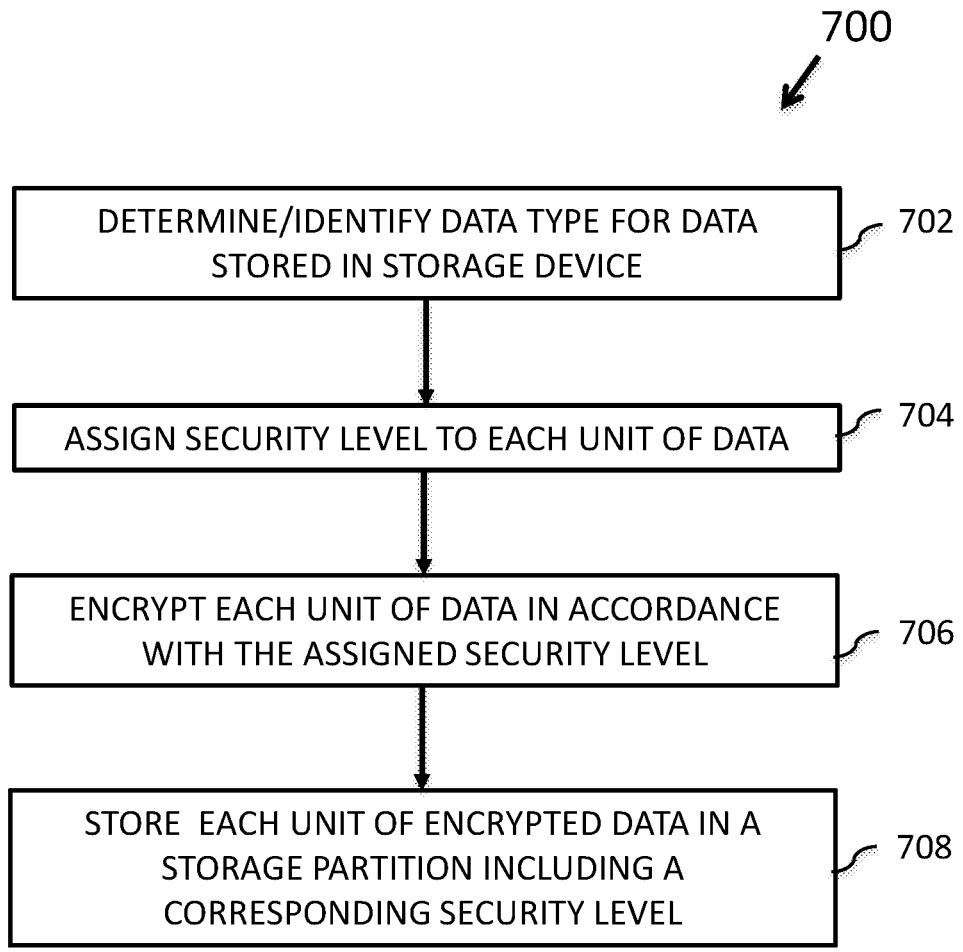
FIG. 7 is a schematic flow chart diagram illustrating another embodiment of a method for providing multi-layered data security in the mobile personal computing device of FIG. 2.

Referring to FIG. 7, FIG. 7 is a schematic flow chart diagram illustrating another embodiment of a method 700 for providing multi-layered data security in a mobile personal computing device 106. At least in the illustrated embodiment, method 700 can begin by machine-learning module 506 determining/identifying a data type for each unit of data stored on a storage device 202 (block 702).

A classification module 502 can assign one of a plurality of security levels (e.g., SL1, SL2, SL3, and SL4, etc.) to each unit of data based on the determined/identified data type (block 704), as discussed elsewhere herein. An encryption module can encrypt each unit of data with an encryption level to generate units of encrypted data (e.g., EL1, EL2, EL3, etc.) in accordance with the security level assigned to each unit of data (block 706), as discussed elsewhere herein.

A processor 204 can stored each unit of encrypted data in a storage partition that includes a corresponding assigned security level (block 708). For example, a unit of encrypted data EL1 can be stored in storage partition 302 because storage partition 302 is assigned SL1, a unit of encrypted data EL2 can be stored in storage partition 304 because storage partition 304 is assigned SL2, a unit of encrypted data EL3 can be stored in storage partition 306 because storage partition 306 is assigned SL3, and a unit of non-encrypted data L4 can be stored in storage partition 308 because storage partition 308 is assigned SL4.

Figure 8:
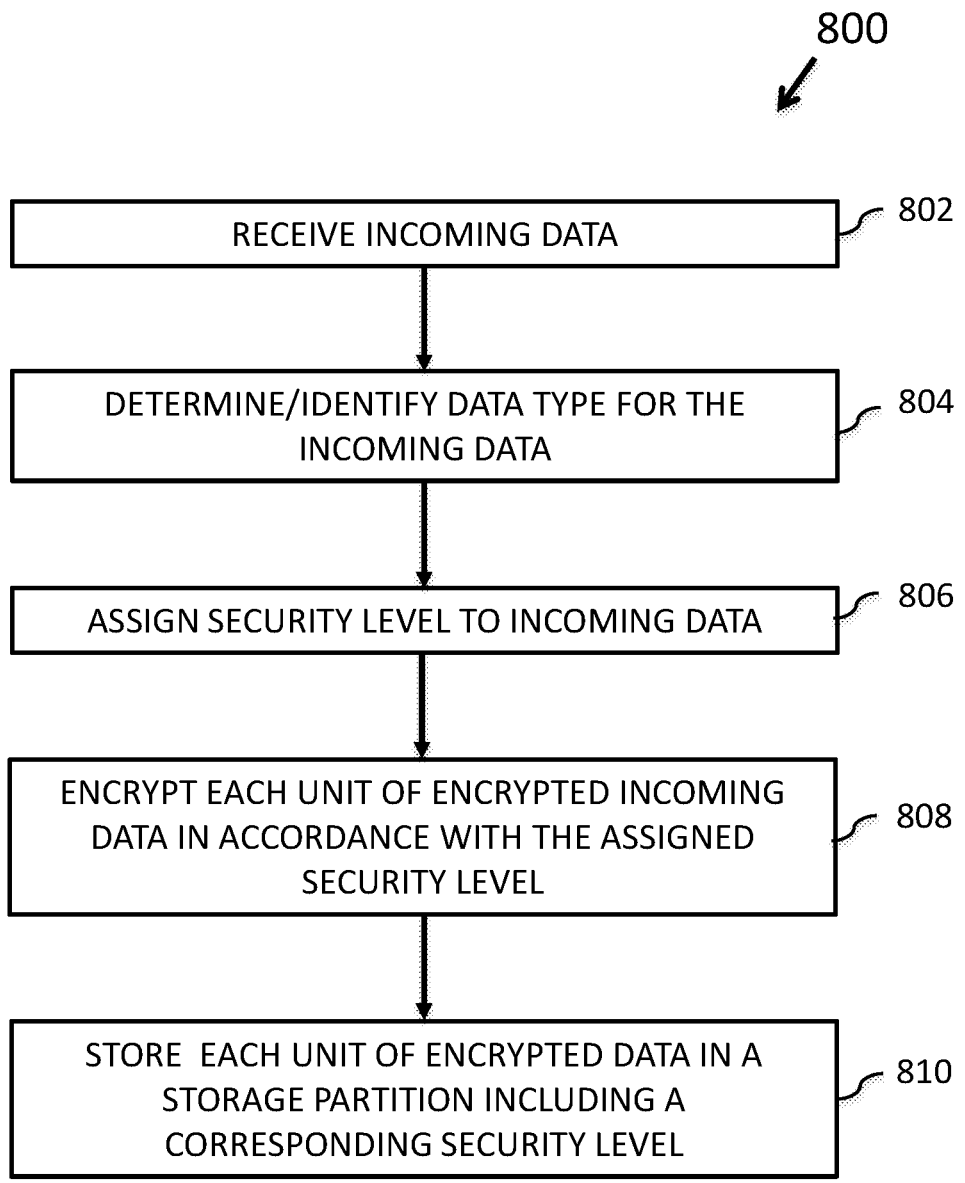
FIG. 8 is a schematic flow chart diagram illustrating still another embodiment of a method for providing multi-layered data security in the mobile personal computing device of FIG. 2.

With reference to FIG. 8, FIG. 8 is a schematic flow chart diagram illustrating an alternative embodiment of a method 800 for providing multi-layered data security in a mobile personal computing device 106. At least in the illustrated embodiment, method 800 can begin by a processor 204 receiving one or more units of incoming data (block 802).

A machine-learning module 506 can determine/identify a data type for each unit of incoming data (block 804) and a classification module 502 can assign one of a plurality of security levels (e.g., SL1, SL2, SL3, and SL4, etc.) to each unit of incoming data based on the determined/identified data type (block 806), as discussed elsewhere herein. An encryption module can encrypt each unit of incoming data with an encryption level to generate units of encrypted data (e.g., EL1, EL2, EL3, etc.) in accordance with the security level assigned to each unit of incoming data (block 808), as discussed elsewhere herein.

Each unit of encrypted incoming data can be stored in a storage partition that includes a corresponding assigned security level (block 810). For example, a unit of encrypted incoming data EL1 can be stored in storage partition 302 because storage partition 302 is assigned SL1, a unit of encrypted incoming data EL2 can be stored in storage partition 304 because storage partition 304 is assigned SL2, a unit of encrypted incoming data EL3 can be stored in storage partition 306 because storage partition 306 is assigned SL3, and a unit of non-encrypted incoming data L4 can be stored in storage partition 308 because storage partition 308 is assigned SL4.

Figure 9:
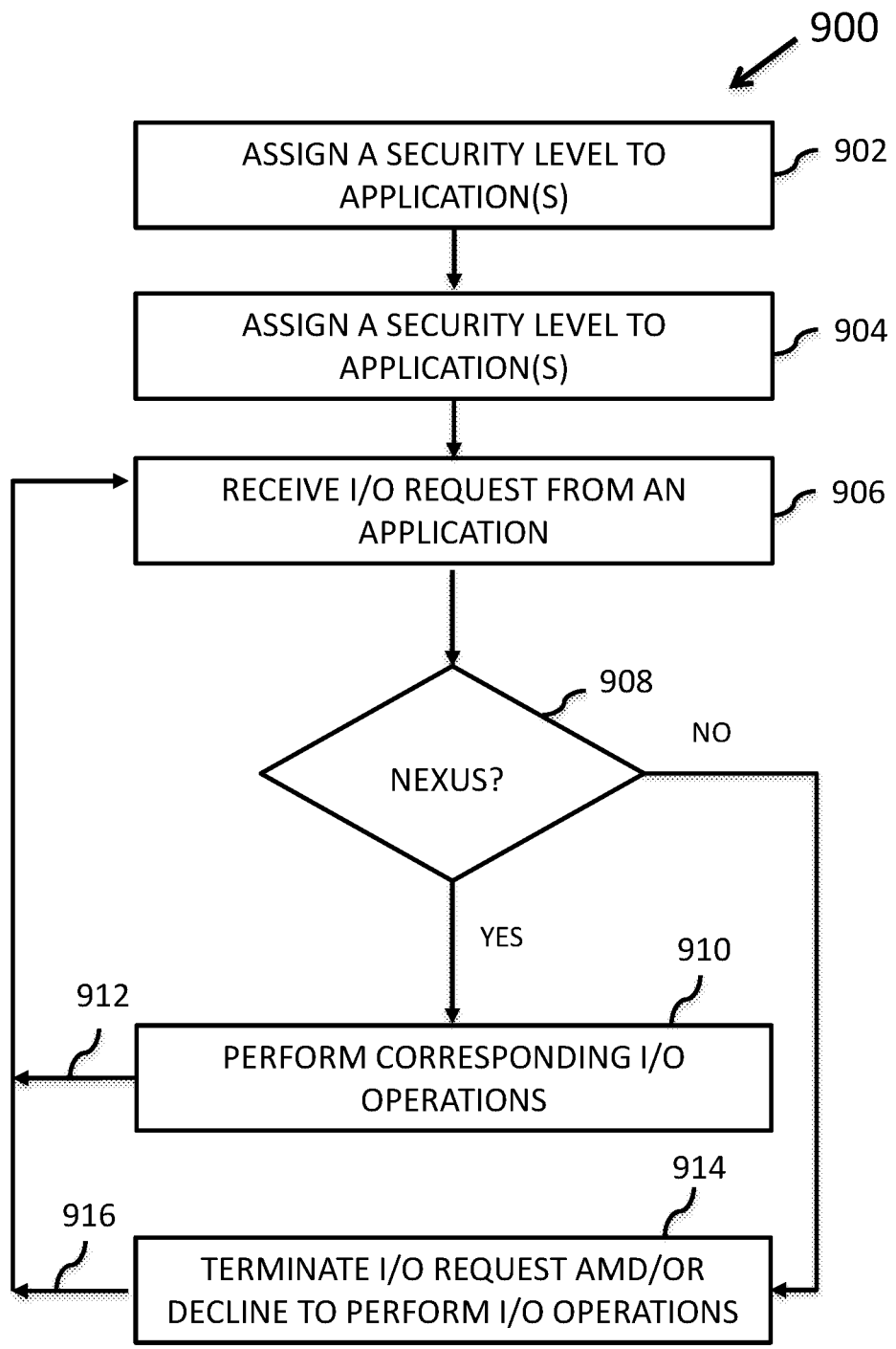
FIG. 9 is a schematic flow chart diagram illustrating yet another embodiment of a method for providing multi-layered data security in the mobile personal computing device of FIG. 2.

Referring to FIG. 9, FIG. 9 is a schematic flow chart diagram illustrating yet another embodiment of a method 900 for providing multi-layered data security in a mobile personal computing device 106. At least in the illustrated embodiment, method 900 can begin by a classification module 502 of a processor 204 assigning one of a plurality of security levels (e.g., SL1, SL2, SL3, and SL4, etc.) to applications 206 of a mobile personal computing device 106 (block 902). The classification module 502 can further assign one of the plurality of security levels to each storage partition (e.g., storage partition 302, storage partition 304, storage partition 306, and storage partition 306, etc.) of a storage device 202 in the mobile personal computing device 106 (block 904).

An I/O module 510 can receive an I/O request (e.g., a read request, write request, etc.) from an application 206 to perform one or more I/O operations on a storage partition (block 906). In response to the I/O request, a security module 504 can determine whether there is nexus of security levels of the requesting application 206 and a storage partition that is the target of the I/O request (block 908), as discussed elsewhere herein.

In response to the security module 504 determining that there is a nexus of security levels of the requesting application 206 and a storage partition that is the target of the I/O request (e.g., a "YES" in block 908), the I/O module 510 can perform I/O operations (e.g., read operations, write operations, etc.) corresponding to the I/O request (block 910). The I/O module 510 can then prepare to receive one or more subsequent I/O requests from the same or another application (return 912).

In response to the security module 504 determining that there is not a nexus of security levels of the requesting application 206 and a storage partition that is the target of the I/O request (e.g., a "NO" in block 908), the I/O module 510 can terminate the I/O request and/or decline to perform I/O operations (e.g., read operations, write operations, etc.) corresponding to the I/O request (block 914). The I/O module 510 can then prepare to receive one or more subsequent I/O requests from the same or another application (return 912).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
a classification module that:
assigns a respective first security level of a plurality of security levels to each application of a plurality of applications of a mobile personal computing device based on a type of application for the each application of the plurality of applications, and
assigns a respective second security level of the plurality of security levels to each storage partition of a plurality of storage partitions of a storage device of the mobile personal computing device;
a security module that provides or denies the each application of the plurality of applications access to the each storage partition of the plurality of storage partitions to access data stored on the each storage partition of the plurality of storage partitions based on a nexus of a match between the respective first security level assigned to the each application of the plurality of applications and the respective second security level assigned to the each storage partition of the plurality of storage partitions; and
an encryption module that changes a respective encryption key for the each storage partition of the plurality of storage partitions in response to the security module determining that the nexus of the match between the respective first security level of the plurality of security levels assigned to the each application of the plurality of applications and the respective second security level of the plurality of security levels assigned to the each storage partition of the plurality of storage partitions is not established, and prevents an entity from using a backdoor access of the each application of the plurality of applications to gain unauthorized access to the data stored on the each storage partition of the plurality of storage partitions via malware, wherein the security module provides to a particular application of the plurality of applications, access to a particular storage partition of the plurality of storage partitions that includes the respective second security level of the plurality of security levels assigned that is less than or equal to the respective first security level of the plurality of security levels assigned to the particular application of the plurality of applications, and denies to the particular application of the plurality of applications, access to the another particular storage partition of the plurality of storage partitions that includes the respective second security level assigned that is greater than the respective first security level assigned to the particular application of the plurality of applications, and wherein at least a portion of each of said classification module, said security module, and said encryption module comprises one or more of a set of hardware circuits and a set of programmable hardware devices.

2. The apparatus of claim 1, wherein: the classification module is configured to one of: automatically assign the respective first security level of the plurality of security levels to the each application of the plurality of the applications, and assign the respective first security level of the plurality of security levels to the each application of the plurality of applications based on user input.

3. The apparatus of claim 1, further comprising: a machine-learning module that determines a respective data type for each portion of a set of data stored on the storage device using a machine-learning technique, wherein: the classification module is configured to assign a corresponding second security level of the plurality of security levels to the each portion of the set of data stored on the storage device based on the respective data type determined for the each portion of the set of data, the each portion of the set of data is stored on a storage partition of the plurality of storage partitions including the respective second security level of the plurality of security levels corresponding to the corresponding second security level of the plurality of security levels assigned to the each portion of the set of data, and at least a portion of said machine-learning module comprises the one or more of the set of hardware circuits and the set of programmable hardware devices.

4. The apparatus of claim 1, further comprising: an input/output (I/O) module that receives incoming data; and a machine-learning module that determines a data type for the incoming data using a machine-learning technique, wherein: the classification module is configured to assign a corresponding second security level of the plurality of security levels to the incoming data based on the data type determined for the incoming data, the I/O module is configured to store the incoming data on a storage partition of the plurality of storage partitions including the respective second security level of the plurality of security levels corresponding to the corresponding second security level of the plurality of security levels assigned to the incoming data, and at least a portion of each of said I/O module and said machine-learning module comprises the one or more of the set of hardware circuits and the set of programmable hardware devices.

5. The apparatus of claim 1, wherein: a first portion of a set of data stored on a first storage partition of the storage device is encrypted using an Advanced Encryption Standard 256-bit (AES-256) encryption technique; a second portion of a set of data stored on a second storage partition of the storage device is encrypted using an AES-192 encryption technique; a third portion of a set of data stored on a third storage partition of the storage device is encrypted using an AES-128 encryption technique; and a fourth portion of a set of data stored on a fourth storage partition of the storage device is stored unencrypted.

6. The apparatus of claim 1, wherein: the classification module is configured to assign each portion of a set of data a respective security level of the plurality of security levels based on a respective data type for each portion; and the each portion of the set of data is stored on a particular storage partition corresponding to the respective security level assigned.

7. The apparatus of claim 1, wherein: the security module is configured to: receive, from a requesting application of the plurality of applications, an input/output (I/O) request to one of read data from or write data to a certain storage partition of the plurality of storage partitions, determine, in response to receiving the I/O request, whether the requesting application and the certain storage partition of the plurality of storage partitions include a nexus of the respective first security level of the plurality of security levels assigned to the requesting application of the plurality of applications and the respective second security level of the plurality of security levels assigned to the certain storage partition of the plurality of storage partitions, and perform data access operations.

8. The apparatus of claim 7, wherein: in performing the data access operations, the security module is configured to perform I/O operations corresponding to reading data from or writing data to the certain storage partition in response to determining that the requesting application and the certain storage partition include the nexus of the respective first security level assigned to the requesting application and the respective second security level assigned to the certain storage partition.

9. The apparatus of claim 8, wherein: the security module is configured to: perform read operations to read data from the certain storage partition in response to the I/O request including a read request in performing the I/O operations, perform write operations to write data to the certain storage partition in response to the I/O request including a write request in performing the I/O operations, and perform the read operations or the write operations without allowing the requesting application to access the certain storage partition.

10. The apparatus of claim 7, wherein: the security module, in performing the data access operations, is configured to terminate the I/O request in response to determining that the requesting application and the certain storage partition do not include the nexus of the respective first security level assigned to the requesting application and the respective second security level assigned to the certain storage partition.

11. A method, comprising:
  assigning, by a processor, a respective first security level of a plurality of security levels to each application of a plurality of applications of a mobile personal computing device based on a type of application for the each application of the plurality of applications;
  assigning, by the processor, a respective second security level of the plurality of security levels to each storage partition of a plurality of storage partitions of a storage device of the mobile personal computing device;
  providing or denying the each application of the plurality of applications access to the each storage partition of the plurality of storage partitions to access data stored on the each storage partition of the plurality of storage partitions based on a nexus of a match between the respective first security level assigned to the each application of the plurality of applications and the respective second security level assigned to the each storage partition of the plurality of storage partitions;
  changing a respective encryption key for the each storage partition of the plurality of storage partitions in response to determining that the nexus of the match between the respective first security level of the plurality of security levels assigned to the each application of the plurality of applications and the respective second security level of the plurality of security levels assigned to the each storage partition of the plurality of storage partitions is not established, and preventing an entity from using a backdoor access of the each application of the plurality of applications to gain unauthorized access to the data stored on the each storage partition of the plurality of storage partitions via malware;
  providing, to a particular application of the plurality of applications, access to a particular storage partition of the plurality of storage partitions that includes the respective second security level of the plurality of security levels assigned that is less than or equal to the respective first security level of the plurality of security levels assigned to the particular application of the plurality of applications; and
  denying, to the particular application of the plurality of applications, access to another particular storage partition of the plurality of storage partitions that includes the respective second security level assigned that is greater than the respective first security level assigned to the particular application of the plurality of applications.

12. The method of claim 11, further comprising:
  receiving, from a requesting application of the plurality of applications, an input/output (I/O) request to one of read data from or write data to a certain storage partition of the plurality of storage partitions;
  determining, in response to receiving the I/O request, whether the requesting application of the plurality of applications and the certain storage partition of the plurality of storage partitions include a nexus of the respective first security level of the plurality of security levels assigned to the requesting application of the plurality of applications and the respective second security level of the plurality of security levels assigned to certain the storage partition of the plurality of storage partitions; and
  performing data access operations.

13. The method of claim 12, wherein:
  performing the data access operations comprises performing I/O operations corresponding to reading data from or writing data to the certain storage partition of the plurality of storage partitions in response to determining that the requesting application of the plurality of applications and the certain storage partition of the plurality of storage partitions include the nexus of the respective first security level of the plurality of security levels assigned to the requesting application of the plurality of applications and the respective second security level of the plurality of security levels assigned to the certain storage partition of the plurality of storage partitions; and
  terminating the I/O request in response to determining that the requesting application of the plurality of applications and the certain storage partition of the plurality of storage partitions do not include the nexus of the respective first security level of the plurality of security levels assigned to the requesting application of the plurality of applications and the respective second security level of the plurality of security levels assigned to the certain storage partition of the plurality of storage partitions, wherein the I/O operations are performed without allowing the requesting application of the plurality of applications to access the certain storage partition of the plurality of storage partitions.

14. The method of claim 11, further comprising:
  determining a respective data type for each portion of a set of data stored on the storage device using a machine-learning technique; and
  assigning a corresponding second security level of the plurality of security levels to the each portion of the set of data stored on the storage device based on the respective data type determined for the each portion of the set of data, wherein the each portion of the set of data is stored on a storage partition of the plurality of storage partitions including the respective second security level of the plurality of security levels corresponding to the corresponding second security level of the plurality of security levels assigned to the each portion of the set of data.

15. The method of claim 11, further comprising:
  receiving incoming data;
  determining a data type for the incoming data using a machine-learning technique;

assigning a corresponding second security level of the plurality of security levels to the incoming data based on the data type determined for the incoming data; and storing the incoming data on a storage partition of the plurality of storage partitions including the respective second security level of the plurality of security levels corresponding to the corresponding second security level of the plurality of security levels assigned to the incoming data.

16. A computer program product comprising a non-transitory computer-readable storage medium including program instructions embodied therewith, the program instructions executable by a processor to cause the processor to:

assign a respective first security level of a plurality of security levels to each application of a plurality of applications of a mobile personal computing device based on a type of application for the each application of the plurality of applications;

assign a respective second security level of the plurality of security levels to each storage partition of a plurality of storage partitions of a storage device of the mobile personal computing device;

provide or deny the each application of the plurality of applications access to the each storage partition of the plurality of storage partitions to access data stored on the each storage partition of the plurality of storage partitions based on a nexus of a match between the respective first security level assigned to the each application of the plurality of applications and the respective second security level assigned to the each storage partition of the plurality of storage partitions;

change a respective encryption key for the each storage partition of the plurality of storage partitions in response to determining that the nexus of the match between the respective first security level of the plurality of security levels assigned to the each application of the plurality of applications and the respective second security level of the plurality of security levels assigned to the each storage partition of the plurality of storage partitions is not established, and prevent an entity from using a backdoor access of the each application of the plurality of applications to gain unauthorized access to the data stored on the each storage partition of the plurality of storage partitions via malware;

providing, provide to a particular application of the plurality of applications, access to a particular storage partition of the plurality of storage partitions that includes the respective second security level of the plurality of security levels assigned that is less than or equal to the respective first security level of the plurality of security levels assigned to the particular application of the plurality of applications; and deny to the particular application of the plurality of applications, access to another particular storage partition of the plurality of storage partitions that includes the respective second security level assigned that is greater than the respective first security level assigned to the particular application of the plurality of applications.

17. The computer program product of claim 16, wherein the program instructions further cause the processor to:

receive, from a requesting application of the plurality of applications, an input/output (I/O) request to one of read data from or write data to a certain storage partition of the plurality of storage partitions;

determine, in response to receiving the I/O request, whether the requesting application of the plurality of applications and the certain storage partition of the plurality of storage partitions include a nexus of the respective first security level of the plurality of security levels assigned to the requesting application of the plurality of applications and the respective second security level of the plurality of security levels assigned to the certain storage partition of the plurality of storage partitions; and perform data access operations.

18. The computer program product of claim 17, wherein:

performing the data access operations comprises performing I/O operations corresponding to reading data from or writing data to the certain storage partition of the plurality of storage partitions in response to determining that the requesting application of the plurality of applications and the certain storage partition of the plurality of storage partitions include the nexus of the respective first security level of the plurality of security levels assigned to the requesting application of the plurality of applications and the respective second security level of the plurality of security levels assigned to the certain storage partition of the plurality of storage partitions; and terminating the I/O request in response to determining that the requesting application of the plurality of applications and the certain storage partition of the plurality of storage partitions do not include the nexus of the respective first security level of the plurality of security levels assigned to the requesting application of the plurality of applications and the respective second security level of the plurality of security levels assigned to the certain storage partition of the plurality of storage partitions, wherein the I/O operations are performed without allowing the requesting application of the plurality of applications to access the certain storage partition of the plurality of storage partitions.

19. The computer program product of claim 16, wherein the program instructions further cause the processor to:

determine a respective data type for each portion of a set of data stored on the storage device using a machine-learning technique; and assign a corresponding second security level of the plurality of security levels to the each portion of the set of data stored on the storage device based on the respective data type determined for the each portion of the set of data, wherein the each portion of the set of data is stored on a storage partition of the plurality of storage partitions including the respective second security level of the plurality of security levels corresponding to the corresponding second security level of the plurality of security levels assigned to the each portion of the set of data.

20. The computer program product of claim 16, wherein the program instructions further cause the processor to:

receive incoming data;

determine a data type for the incoming data using a machine-learning technique;

assign a corresponding second security level of the plurality of security levels to the incoming data based on the data type determined for the incoming data; and store the incoming data on a storage partition of the plurality of storage partitions including the respective second security level of the plurality of security levels corresponding to the corresponding second security level of the plurality of security levels assigned to the incoming data.

\* \* \* \* \*